United States Patent Office.

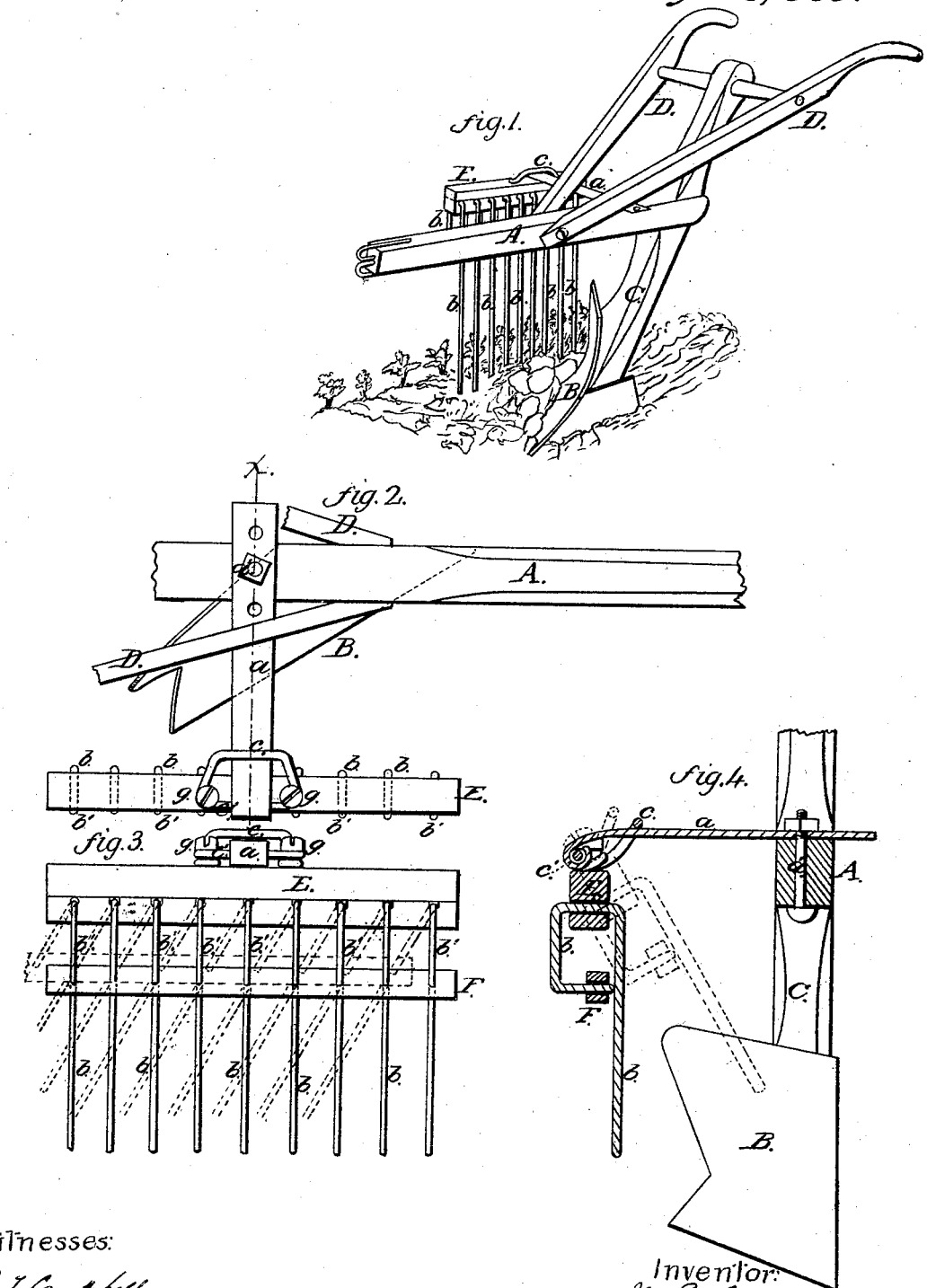

WILLIS E. MOORE, OF CRAWFORDSVILLE, INDIANA.

Letters Patent No. 90,376, dated May 25, 1869.

---

IMPROVEMENT IN FENDER FOR CULTIVATOR-PLOWS.

---

The Schedule referred to in these Letters Patent and making part of the same.

---

*To all whom it may concern:*

Be it known that I, WILLIS E. MOORE, of Crawfordsville, in the county of Montgomery, and State of Indiana, have invented a new and improved Fender for Cultivator-Plows; and I do hereby declare that the following is a full, clear, and exact description thereof, reference being had to the accompanying drawings, making part of this specification, in which—

Figure 1 is a perspective view of a plow having my fender applied to it.

Figure 2 is a top view of the fender, applied to a portion of a plow-beam.

Figure 3 is a side view of the fender.

Figure 4 is a cross-section through the fender and plow-beam, taken in the vertical plane indicated by line $x$ in fig. 2.

Similar letters of reference indicate corresponding parts in the several figures.

This invention relates to an improved mode of constructing fenders which are applicable to cultivator-plows, and designed for preventing heavy clods of earth from being thrown upon young plants while turning loose earth about their roots.

The nature of my invention consists—

First, in a novel manner of pivoting the teeth, constituting the fender, to heads, so that while these teeth will always be held parallel to one another, their free ends will be allowed to swing freely in a vertical plane, and thus to rise and descend and accommodate themselves to inequalities of surface passed over, as will be hereinafter explained.

Secondly, in a novel mode of pivoting the head of the fender to an arm extending out laterally from one side of the plow-beam, whereby the teeth of the fender are allowed to swing inwardly from a vertical plane, but are checked if there is a tendency to press them outwardly beyond this plane, as will be hereinafter explained.

To enable others skilled in the art to understand my invention, I will describe its construction and operation.

In the accompanying drawings, figs. 1, 2, and 4, I have represented my improved fender applied to a light turn-plow, which may be made in any suitable well-known manner which will adapt it for the cultivation of plants.

A is the beam of this plow.

B, the mould-board.

C, the beam.

D D, the handles, or stilts.

$a$ is an arm, which is secured on top of the beam A by a bolt and nut, $a'$, and which extends out laterally a suitable distance, and has pivoted to it, in a line parallel to beam A, the head E of the improved fender.

The arm $a$ may have several holes made through it at suitable distances apart, for receiving bolt-fastening $a'$, and allowing the head E to be adjusted at different distances from the beam A.

The arm $a$ is located just in rear of the front ends of handles D D, and it has an eye formed on its outer end, through which a pivot, $c'$, passes, which will allow the tines $b$ to vibrate toward and from the mould-board.

By means of a loop, $c$, passing across the arm $a$, as clearly shown in figs. 2, 3, and 4, the tines are prevented from swinging outwardly beyond a plane perpendicular to the said sustaining-arm.

The pivot $c'$ and stop-loop $c$ may be formed of one piece, and secured on top of head E by the screws $g$ $g$, or in any other suitable manner.

The tines $b$ are attached by loops, $b'$, formed on their upper ends, to the head E, and also to a bar, F, as shown in figs. 3 and 4.

These tines have rectangular loops, $b'$, formed on them, as above stated, the ends of which loops are received by holes made through the bar F, and the upper portions are received in holes made through the head E. By thus pivoting the tines to the two bars E F, it will be seen that the free ends of the tines are allowed to vibrate vertically, and will thus rise and descend, and accommodate themselves to inequalities of surface passed over. The bar or head E serves as a means for suspending the tines, while the bar F keeps the tines parallel to one another, and at the same time serves to support them against pressure of clods thrown up against them.

It will be seen, from the above description, that I have a fender, the tines of which will allow loose earth to pass freely between them, but prevent the passage of clods of earth, or other substance, which might break down or injure young plants. Also, that the free ends of the tines will swing freely in a direction with the length of the plow-beam A, and also in a plane at right angles thereto.

I am aware that it is not a new idea to employ fenders in combination with cultivator-plows, for protecting young plants from injury while throwing loose earth about their roots, but I am not aware that a flexible fender, constructed to operate substantially as I have above described, has been known or used prior to my invention.

What I claim as new, and desire to secure by Letters Patent, is—

1. A guard, or clod-fender for cultivators, composed of tines $b$ $b'$, formed and pivoted to head E and bar F, substantially as described.

2. A jointed fender, attached to arm $a$ by means of a pivot-joint, and provided with a stop, $c$, substantially as described.

WILLIS E. MOORE.

Witnesses:
BEN. T. RISTINE,
MATTHIAS FRANTZ.